United States Patent
Nakamura

(10) Patent No.: US 9,306,695 B2
(45) Date of Patent: Apr. 5, 2016

(54) FRAME TRANSMITTING APPARATUS, FRAME RECEIVING APPARATUS, AND FRAME TRANSMISSION/RECEPTION SYSTEM AND METHOD

(75) Inventor: Toshihiko Nakamura, Kanagawa (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 653 days.

(21) Appl. No.: 13/490,997

(22) Filed: Jun. 7, 2012

(65) Prior Publication Data

US 2012/0314717 A1 Dec. 13, 2012

(30) Foreign Application Priority Data

Jun. 7, 2011 (JP) ................................. 2011-127341

(51) Int. Cl.
H04J 3/06 (2006.01)

(52) U.S. Cl.
CPC ............. *H04J 3/0697* (2013.01); *H04J 3/0667* (2013.01)

(58) Field of Classification Search
None
See application file for complete search history.

(56) References Cited

U.S. PATENT DOCUMENTS

| 7,860,125 B2* | 12/2010 | Bains ................... H04L 43/106 370/469 |
| 2008/0117938 A1* | 5/2008 | Erich et al. .................... 370/503 |
| 2009/0013330 A1 | 1/2009 | Gotz et al. |
| 2009/0190613 A1* | 7/2009 | Finn ...................... H04J 3/0697 370/509 |
| 2010/0153742 A1* | 6/2010 | Kuo et al. ..................... 713/189 |
| 2011/0273995 A1* | 11/2011 | Ahn ..................... H04L 41/5003 370/241 |

FOREIGN PATENT DOCUMENTS

| JP | 2008-042715 A | 2/2008 |
| JP | 2010-190635 A | 9/2010 |

OTHER PUBLICATIONS

An Office Action; "Notice of Reason for Rejection," issued by the Japanese Patent Office on Jan. 13, 2015, which corresponds to Japanese Patent Application No. 2011-127341 and is related to U.S. Appl. No. 13/490,997; with English language partial translation.

The First Office Action issued by the State Intellectual Property Office, P.R. China on Nov. 27, 2015, which corresponds to Chinese Patent Application No. 201210185944.1 and is related to U.S. Appl. No. 13/490,997; with English language translatation.

\* cited by examiner

*Primary Examiner* — Joseph Bednash
(74) *Attorney, Agent, or Firm* — Studebaker & Brackett PC

(57) ABSTRACT

To enable more precise synchronization of distributed clocks, before a high-level frame is converted to a low-level frame for transmission over a communication network, if the high-level frame includes a certain type of message, it is flagged. The flag is detected during the conversion process, and the time of detection is stored as a transmission timestamp. When a low-level frame is received from the network, it is immediately timestamped with the time of reception. The timestamped frame is then converted to a high-level frame, and if the high-level frame includes the certain type of message, the timestamp is stored as a reception timestamp.

14 Claims, 10 Drawing Sheets

FIG.4A

FR1 — | PREAMBLE | SFD | DESTINATION ADDRESS | SOURCE ADDRESS | MACsec HEADER | ENCRYPTED DATA | AUTHENTICATION VECTOR | FCS |

FIG.4B

FR2 — | DESTINATION ADDRESS | SOURCE ADDRESS | MACsec HEADER | ENCRYPTED DATA | AUTHENTICATION VECTOR | FCS | TIMESTAMP |

FIG.4C

FR3 — | DESTINATION ADDRESS | SOURCE ADDRESS | DECRYPTED DATA | TIMESTAMP |

FIG.4D

FR4 — | DESTINATION ADDRESS | SOURCE ADDRESS | DECRYPTED DATA |

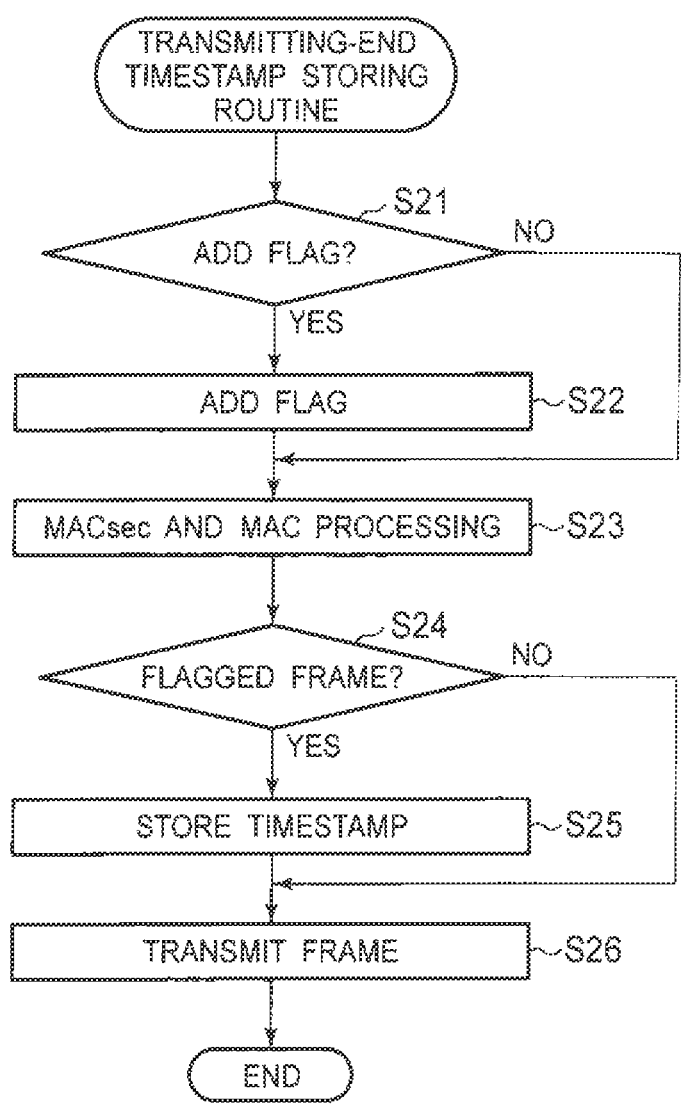

FIG. 8A — FS1: FLAG | DESTINATION ADDRESS | SOURCE ADDRESS | PLAINTEXT DATA

FIG. 8B — FS2: FLAG | DESTINATION ADDRESS | SOURCE ADDRESS | MACsec HEADER | ENCRYPTED DATA | AUTHENTICATION VECTOR FIG. 8C — FS3: DESTINATION ADDRESS | SOURCE ADDRESS | MACsec HEADER | ENCRYPTED DATA | AUTHENTICATION VECTOR | FCS FIG. 8D — FS4: PREAMBLE | SFD | DESTINATION ADDRESS | SOURCE ADDRESS | MACsec HEADER | ENCRYPTED DATA | AUTHENTICATION VECTOR | FCS

FRAME TRANSMITTING APPARATUS, FRAME RECEIVING APPARATUS, AND FRAME TRANSMISSION/RECEPTION SYSTEM AND METHOD

BACKGROUND OF THE INVENTION

1. Field of the Invention

The present invention relates to a method of synchronizing clocks in devices that transmit and receive data frames via a network, and to relevant systems and apparatus.

2. Description of the Related Art

Methods of synchronizing clocks in devices that exchange data frames over the Internet or another communication network are well known. Exemplary methods and apparatus are disclosed by Inomata in Japanese Patent Application Publication (JP) 2010-190635. These and many other known methods use the Precision Time Protocol (PTP) defined by the Institute of Electrical and Electronics Engineers (IEEE) in its 1588 family of standards.

The IEEE 1588-2002 standard defines Sync, FollowUp, DelayReq, and DelayResp messages for use in clock synchronization. Sync and DelayReq messages are timestamped when transmitted and received, and the transmitting or receiving device stores the timestamp. Conventionally, each transmitted or received frame is analyzed in an interface layer such as a media independent interface (MII) or gigabit media independent interface (GMII) layer, and a timestamp is generated and stored if the frame includes a Sync or DelayReq message.

A problem with this conventional timestamping method is that analyzing all outgoing frames on the MII or other interface to decide which frames include a Sync or DelayReq message involves a considerable processing load. The time taken to perform the analysis also lowers the precision of the timestamp. A similar problem occurs in frame reception: before storing the timestamp of a frame, the receiving apparatus must analyze the frame on the MII or other interface to determine whether the frame includes a Sync or DelayReq message, and the precision of the timestamp is reduced by the time required for the analysis. These problems make it difficult to determine the network latency precisely, which is necessary for precise clock synchronization.

The problems are aggravated when security protection is employed. If the IEEE 802.1AE Media Access Control Security (MACsec) standard is used, as discussed by Ida et al. in JP 2008-42715, for example, frames on the MII or other interface are encrypted and defy analysis. The present inventor considered having the timestamp of a MACsec frame stored before the frame is encrypted at the transmitting end and after the frame is decrypted at the receiving end, but that would further lower the timestamp precision, because the time required for encryption and decryption would be added to the intrinsic network latency.

SUMMARY OF THE INVENTION

An object of the present invention is to improve the precision of timestamps in a communication network.

Another object of the invention is to reduce the interface processing load involved in generation of the timestamps.

The invention provides a method of transmitting frames over a communication network. High-level frames are selectively flagged, depending on their content, at the transmitting end. Each high-level frame is then converted to a low-level (physical layer) frame and the low-level frame is transmitted over the communication network. During conversion of the high-level frame to the low-level frame, whether the high-level frame was flagged is determined. If the high-level frame has been flagged, the time of detection of the flag is stored as a transmission time.

When the low-level frame is received from the communication network, a timestamp representing the time of reception is generated and added to the low-level frame. The resulting timestamped frame is then converted to a received high-level frame, and the time represented by the timestamp is selectively stored, depending on the content of the received high-level frame, as a reception time.

The stored transmission and reception times exclude time spent on processes carried out in conversion between high-level and low-level frames, such as frame analysis, encryption, decryption, and data processing, so they can be used as accurate timestamps for precise clock synchronization at the receiving and transmitting ends of the communication network.

The interface processing load involved in generating the timestamps is reduced at the transmitting end because frame content does not have to be analyzed during the frame conversion process or timestamp storing process. Instead, it is only necessary to check a flag.

The invention also provides a frame transmitting apparatus, a frame receiving apparatus, and a frame transmission and reception system employing the method described above.

BRIEF DESCRIPTION OF THE DRAWINGS

In the attached drawings:

FIGS. 4A to 4D illustrate frame structures used by the frame receiving apparatus;

FIG. 7 is a flowchart illustrating a timestamp storing routine executed by the frame transmitting apparatus;

FIGS. 8A to 8D illustrate frame structures used by the frame transmitting apparatus;

DETAILED DESCRIPTION OF THE INVENTION

Figure 1:
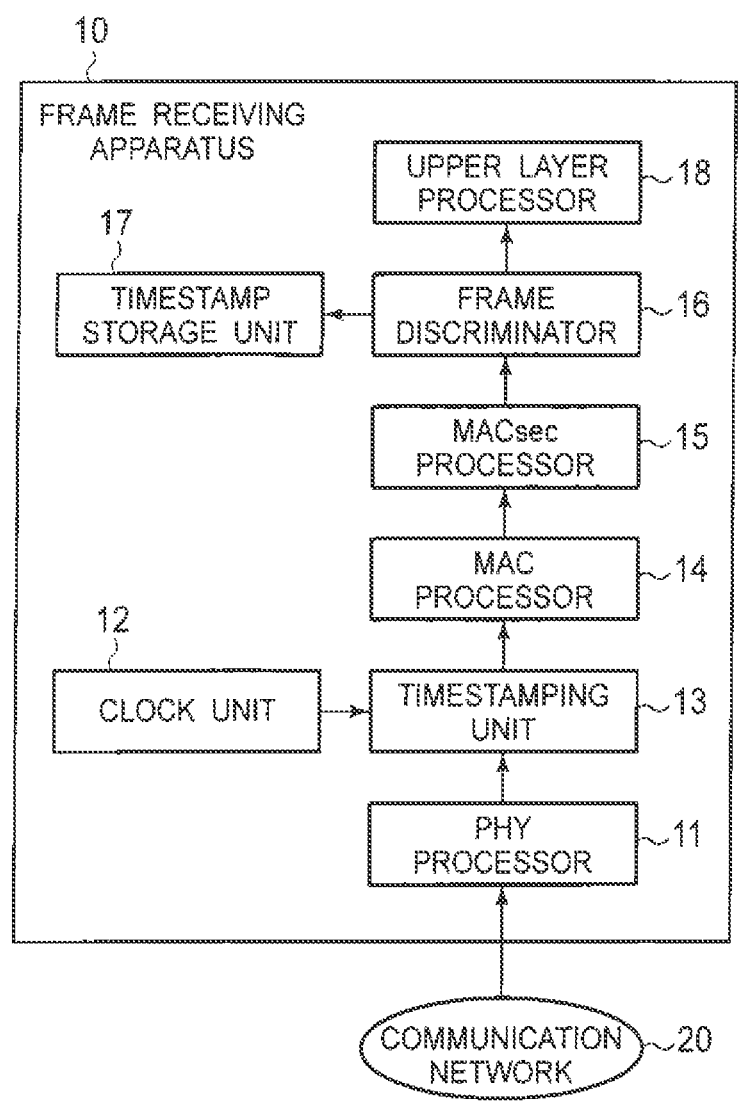
FIG. 1 is a block diagram illustrating the structure of a frame receiving apparatus embodying the invention.

Embodiments of the invention will now be described with reference to the attached drawings, in which like elements are indicated by like reference characters.

Receiving Apparatus Embodiment

FIG. 1 shows a novel frame receiving apparatus 10 including a physical layer (PHY) processor 11, a clock unit 12, a timestamping unit 13, a media access control (MAC) processor 14, a MAC security (MACsec) processor 15, a frame discriminator 16, a timestamp storage unit 17, and an upper layer processor 18.

The physical layer processor 11 is a receiving unit connected to a communication network 20, such as the Internet, from which it receives and sequentially processes frames referred to below as low-level frames. The physical layer processor 11 carries out processing related to the physical layer of the Open Systems Interconnection (OSI) reference model.

The clock unit 12 constantly generates current time information representing the current time.

The timestamping unit 13 adds current time information generated by the clock unit 12 as a timestamp to each low-level frame that has been processed by the physical layer processor 11. A frame with a timestamp added will be referred to as a timestamped frame.

The MAC processor 14 performs processing related to the media access control (MAC) layer, which is the layer just above the physical layer, on each successive timestamped low-level frame. This processing includes, for example, address analysis and frame check sequence (FCS) confirmation. During this processing, the MAC processor 14 temporarily separates the added timestamp from the frame.

The MACsec processor 15 removes security protection by decrypting and authenticating each successive timestamped frame that has been processed by the MAC processor 14. During these MACsec processes, the MACsec processor 15 also temporarily separates the added timestamp from the frame. The MAC processor 14 and MACsec processor 15 together constitute a conversion unit.

The frame discriminator 16 decides whether or not to store the timestamp of each timestamped frame that has been processed by the MACsec processor 15.

Specifically, if the timestamped frame includes a Sync or DelayReq message, the frame discriminator 16 decides to store the timestamp, removes the timestamp from the frame, passes the timestamp to the timestamp storage unit 17, and passes the frame, without the timestamp, to the upper layer processor 18. The frame passed to the upper layer processor 18 will be referred to below as a high-level frame. The high-level frame belongs to a layer above the physical layer, that is, to the MAC layer or a higher layer.

If the timestamped frame does not include a Sync or DelayReq message, the frame discriminator 16 discards the timestamp and passes the resulting high-level frame, without the timestamp, to the upper layer processor 18.

The timestamp storage unit 17 stores the timestamps received from the frame discriminator 16, which have been taken from frames found to include a Sync or DelayReq message. The frame discriminator 16 and timestamp storage unit 17 thus constitute a storing unit.

The upper layer processor 18 performs processing related to a still higher layer, such as the network layer in the OSI reference model, on each successive high-level frame.

Figure 2:
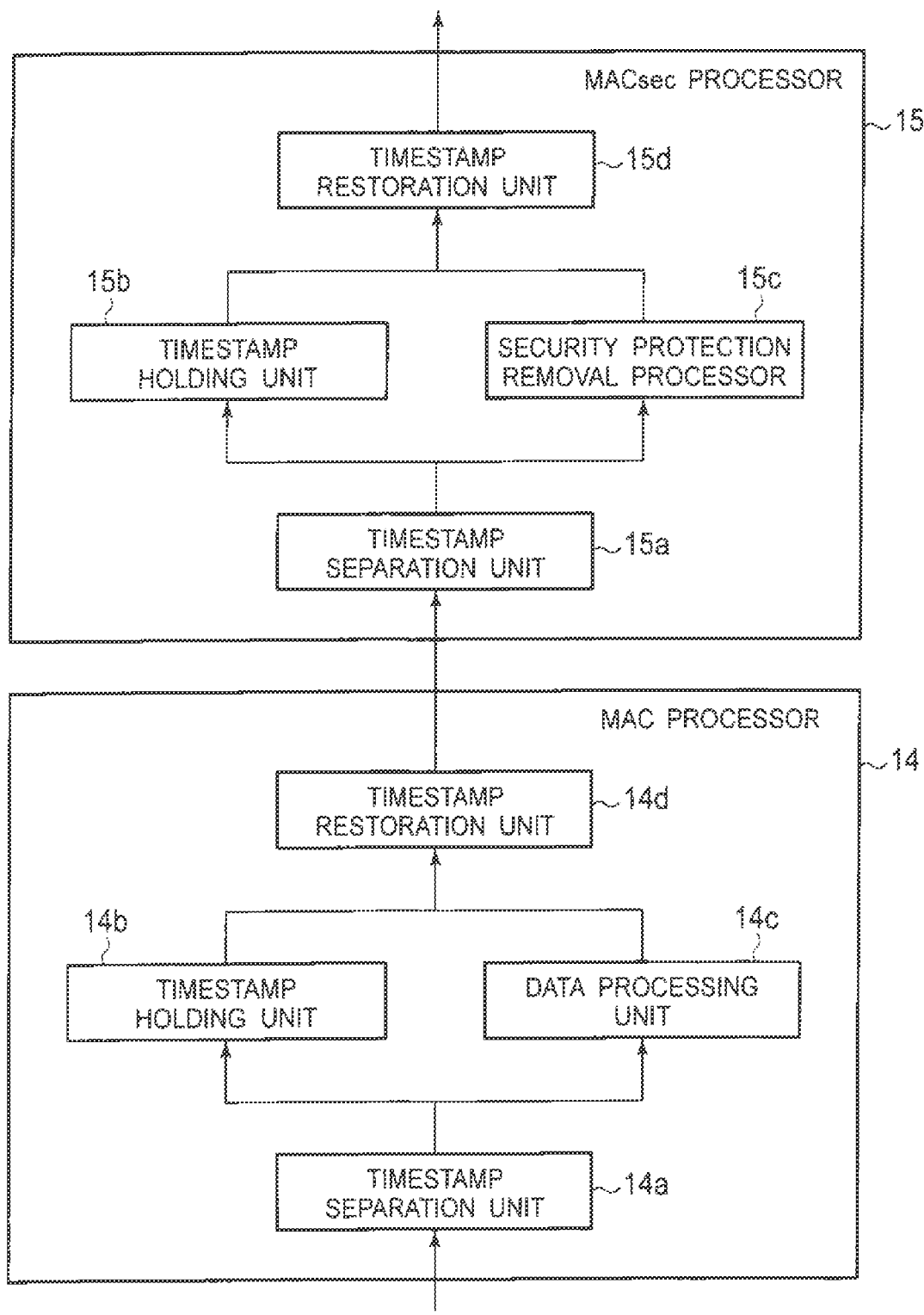
FIG. 2 is a block diagram illustrating the structures of the MAC processor and MACsec processor in FIG. 1.

Next, the structure of the MAC processor 14 and MACsec processor 15 will be described with reference to FIG. 2.

The MAC processor 14 includes a timestamp separation unit 14*a*, a timestamp holding unit 14*b*, a data processing unit 14*c*, and a timestamp restoration unit 14*d*. The MACsec processor 15 includes a timestamp separation unit 15*a*, a timestamp holding unit 15*b*, a security protection removal processor 15*c*, and a timestamp restoration unit 15*d*.

Timestamp separation unit 14*a* separates the timestamp that has been added to a timestamped frame supplied from the timestamping unit 13 in FIG. 1.

Timestamp holding unit 14*b* temporarily holds the separated time stamp.

Data processing unit 14*c* performs MAC processing on the data in the frame after its timestamp has been removed.

Timestamp restoration unit 14*d* restores the timestamp temporarily held in timestamp holding unit 14*b* to the frame after the MAC processing by data processing unit 14*c*, thereby reconfiguring the timestamped frame, and supplies the reconfigured frame to the timestamp separation unit 15*a* in the MACsec processor 15.

In timestamp separation unit 15*a*, the timestamp that was added by timestamp restoration unit 14*d* to reconfigure the timestamped frame is again separated from the frame.

Timestamp holding unit 15*b* temporarily holds the separated time stamp.

The security protection removal processor 15*c* removes security protection from the frame after the timestamp has been removed by the timestamp separation unit 15*a*.

Timestamp restoration unit 15*d* restores the timestamp temporarily held in timestamp holding unit 15*b* to the frame processed by the security protection removal processor 15*c*, thereby reconfiguring the timestamped frame, and supplies the reconfigured frame to the frame discriminator 16.

The timestamp storing process carried out in the frame receiving apparatus 10 will now be described with reference to FIG. 3 and FIGS. 4A to 4D.

Figure 3:
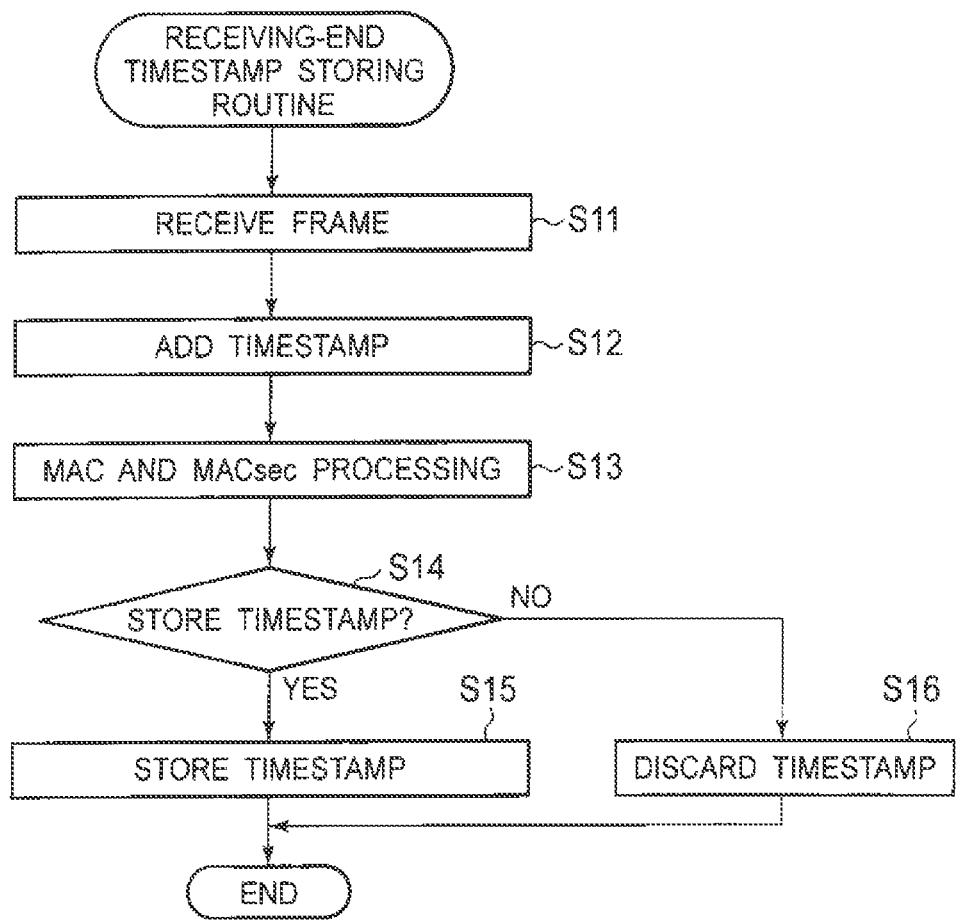
FIG. 3 is a flowchart illustrating a timestamp storing routine executed by the frame receiving apparatus.

First, the physical layer processor 11 receives a low-level frame FR1 from the communication network 20 (step S11 in FIG. 3). The low-level frame FR1 includes a preamble, a start frame delimiter (SFD), a destination address, a source address, a MACsec header, encrypted data, an authentication vector, and an FCS, as shown in FIG. 4A.

Next, the clock unit 12 adds a timestamp to the low-level frame FR1 to configure a timestamped frame FR2 (step S12). The timestamped frame FR2 includes the destination address, source address, MACsec header, encrypted data, authentication vector, FCS, and timestamp, as shown in FIG. 4B.

Next, the MAC processor 14 performs MAC processing on the timestamped frame FR2, and the MACsec processor 15 performs MACsec processing to remove security protection, thereby configuring a timestamped frame FR3 (step S13).

To perform MAC processing, timestamp separation unit 14*a* (FIG. 2) temporarily separates the timestamp from the frame. The separated timestamp is held in timestamp holding unit 14*b*, and restored to the frame by timestamp restoration unit 14*d* after the MAC processing of the data by the data processing unit 14*c*. To perform MACsec processing, timestamp separation unit 15*a* (FIG. 2) also temporarily separates the timestamp. The separated timestamp is held in timestamp holding unit 15*b* while security protection is being removed by the security protection removal processor 15*c*, and then restored to the frame by timestamp restoration unit 15*d*. These operations prevent the timestamp from being affected by the MAC and MACsec processing. The timestamped frame FR3 includes the destination address, source address, decrypted data, and timestamp, as shown in FIG. 4C.

Next, the frame discriminator 16 analyzes the timestamped frame FR3 and decides whether or not to store the timestamp (step S14). The analysis is possible because frame FR3 is unprotected and its data have been decrypted. If the timestamped frame FR3 includes a Sync or DelayReq message, the frame discriminator 16 decides to store the timestamp and supplies the timestamp to the timestamp storage unit 17, which then stores the timestamp (step S15).

If the frame discriminator 16 determines in step S14 that the timestamped frame FR3 does not include a Sync or DelayReq message, it discards the timestamp that was added to the timestamped frame FR3 (step S16).

Regardless of whether or not the timestamp is stored, the frame discriminator 16 supplies the frame to the upper layer processor 18 as a high-level frame FR4 including the destination address, source address, and decrypted data but not including the timestamp, as shown in FIG. 4D.

In the embodiment described above, the frame receiving apparatus 10 adds a timestamp to each low-level frame received from the communication network 20, temporarily removes the timestamp to carry out MAC and MACsec processing, and restores the unaltered timestamp after these steps. The timestamped frame is then analyzed, and depending on the result of the analysis, the timestamp is stored.

With this structure, the time of reception of a frame can be stored as its timestamp, so when network latency is calculated from the timestamps, the calculated latency excludes extraneous factors such as the time required for MAC processing, and for security related processing such as decryption. In addition, since the timestamp is added to a frame before the decision as to whether or not to store the timestamp is made, the calculated network latency excludes the time required to analyze the frame and make this decision.

The frame receiving apparatus 10 in this embodiment can therefore provide high-precision timestamp information.

Transmitting Apparatus Embodiment

Figure 5:
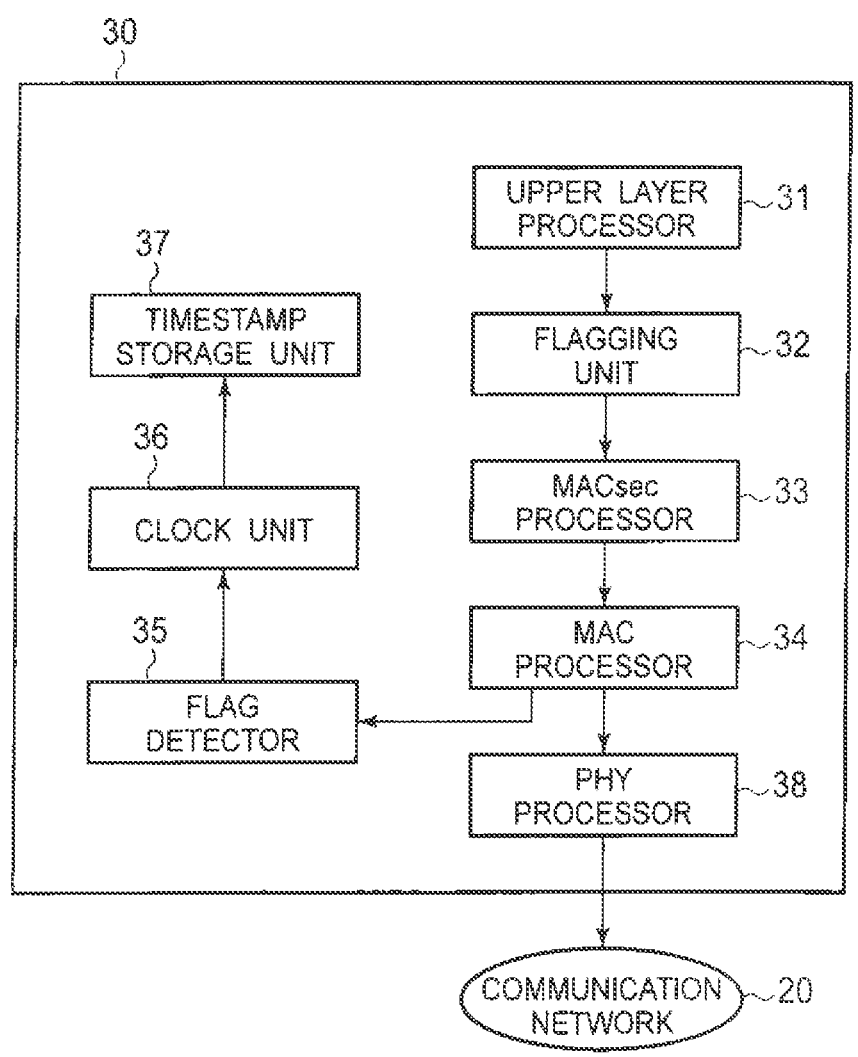
FIG. 5 is a block diagram illustrating a frame transmitting apparatus embodying the invention.

FIG. 5 shows a novel frame transmitting apparatus 30 including an upper layer processor 31, a flagging unit 32, a MACsec processor 33, a MAC processor 34, a flag detector 35, a clock unit 36, a timestamp storage unit 37, and a physical layer (PHY) processor 38.

The upper layer processor 31 generates a frame (referred to below as a high-level frame) by performing processing related to a layer such as the network layer in the OSI reference model and supplies the generated frame to the flagging unit 32.

The flagging unit 32 determines whether or not to flag each high-level frame supplied from the upper layer processor 31. If the high-level frame includes a Sync or DelayReq message, the flagging unit 32 adds a flag to the frame and supplies the frame to the MACsec processor 33. A high-level frame with a flag added in this way will be referred to as a flagged frame. If the high-level frame does not include a Sync or DelayReq message, the flagging unit 32 supplies the high-level frame to the MACsec processor 33 without adding the flag.

The MACsec processor 33 performs encryption or other MACsec processing for security protection of each successive supplied frame. If the supplied frame is a flagged frame, the MACsec processor 33 temporarily separates the flag before performing the MACsec processing. After performing the MACsec processing, the MACsec processor 33 restores the flag to the processed frame and supplies the frame to the MAC processor 34.

The MAC processor 34 performs processing related to the MAC layer of the OSI reference model on each successive frame supplied from the MACsec processor 33. If the supplied frame is a flagged frame, the MAC processor 34 separates the flag from the frame before performing this MAC processing. After the MAC processing, the MAC processor 34 supplies the frame, referred to below as a low-level frame, to the flag detector 35.

The flag detector 35 determines whether each frame processed by the MAC processor 34 was flagged or not. In the description below, the flag detector 35 detects the flag by means of a flag signal supplied from the MAC processor 34. If the flag detector 35 determines that the frame was flagged, it supplies current time information generated by the clock unit 36 to the timestamp storage unit 37 as a time stamp.

The clock unit 36 constantly generates current time information representing the current time.

The timestamp storage unit 37 stores the timestamps of flagged frames. The timestamps are received from the clock unit 36 at the direction of the flag detector 35.

The MACsec processor 33 and MAC processor 34 constitute a conversion unit. The clock unit 36 and timestamp storage unit 37 constitute a storing unit.

The physical layer processor 38 is a transmitting unit that performs processing related to the physical layer of the OSI reference model on each successive low-level frame supplied form the MAC processor 34, and transmits the processed low-level frame to the communication network 20.

Figure 6:
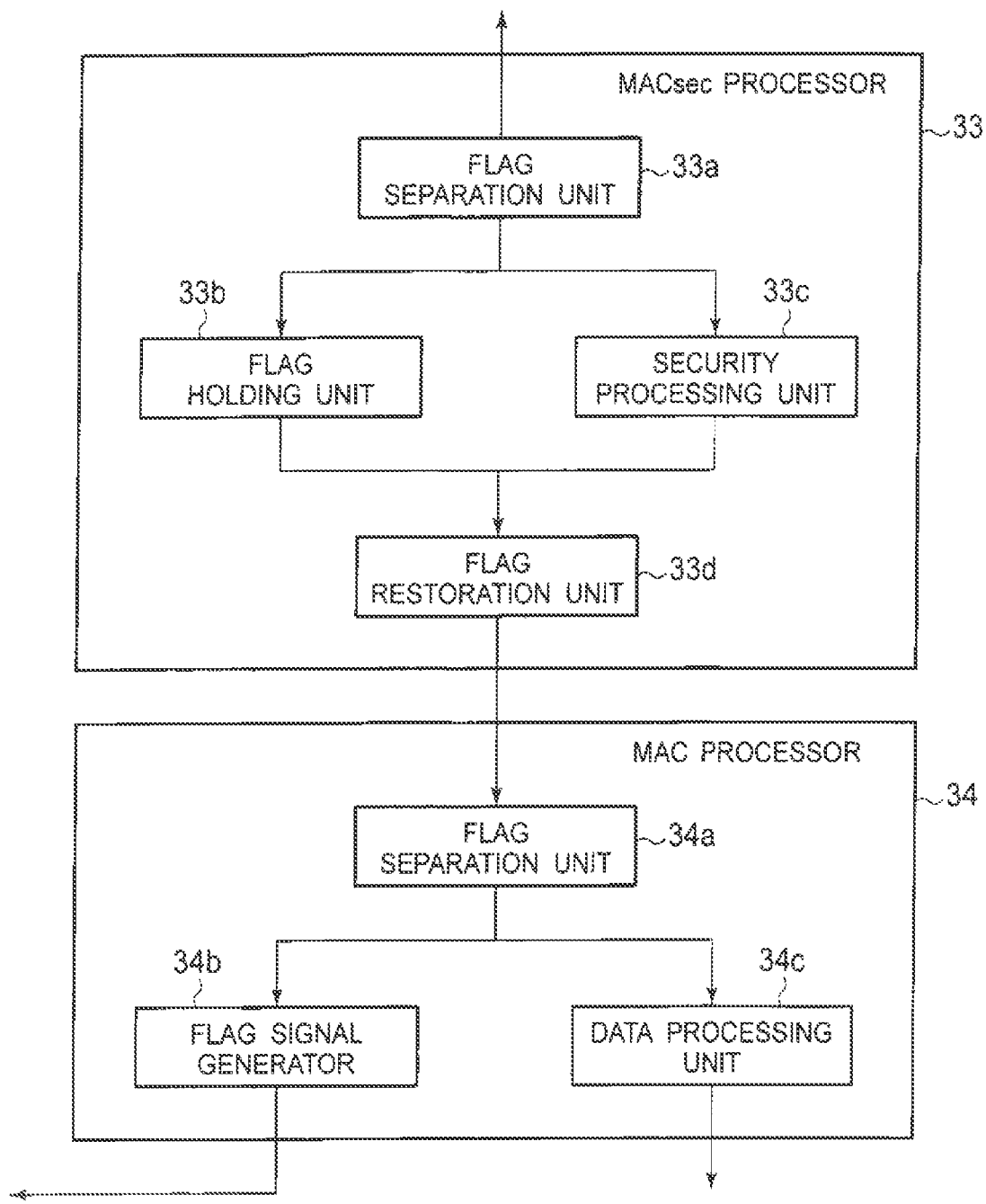
FIG. 6 is a block diagram illustrating the structures of the MACsec processor and MAC processor in FIG. 5.

FIG. 6 shows the structure of the MACsec processor 33 and MAC processor 34. The MACsec processor 33 includes a flag separation unit 33a, a flag holding unit 33b, a security processing unit 33c, and a flag restoration unit 33d. The MAC processor 34 includes a flag separation unit 34a, a flag signal generator 34b, and a data processing unit 34c.

The flag separation unit 33a separates the flag that has been added to a flagged frame supplied from the flagging unit 32 in FIG. 5.

The flag holding unit 33b temporarily holds the separated flag.

The security processing unit 33c performs MACsec processing on the data in the frame after its flag has been removed by the flag separation unit 33a.

The flag restoration unit 33d restores the flag temporarily held in the flag holding unit 33b to the frame after the MACsec processing by the security processing unit 33c, thereby reconfiguring the flagged frame, and supplies the reconfigured frame to the flag separation unit 34a in the MAC processor 34.

In flag separation unit 34a, the flag that was added by the flag restoration unit 33d to reconfigure the flagged frame is again separated from the reconfigured frame and supplied to the flag signal generator 34b.

After receiving the separated flag from the flag separation unit 34a, the flag signal generator 34b generates a flag signal and supplies the flag signal to the flag detector 35 in FIG. 5.

The data processing unit 34c performs data processing on the frame after its flag has been removed by the flag separation unit 34a, thereby configuring the frame as a low-level frame, and supplies the low-level frame, without a flag, to the physical layer processor 38 in FIG. 5.

The timestamp storing process carried out in the frame transmitting apparatus 30 will now be described with reference to FIG. 7 and FIGS. 8A to 8D.

First, the flagging unit 32 receives a high-level frame from the upper layer processor 31 and decides whether or not to flag the frame (step S21). If the high-level frame includes a Sync or DelayReq message, the flagging unit 32 adds a flag to the frame, thereby configuring it as a flagged high-level frame FS1, and supplies the flagged frame FS1 to the MACsec processor 33 (step S22). The flagged frame FS1 includes the flag, a destination address, a source address, and plaintext data, as shown in FIG. 8A.

If the flagging unit 32 determines in step S21 that the high-level frame does not include a Sync or DelayReq message, it supplies the high-level frame without a flag to the MACsec processor 33.

Next, the MACsec processor 33 performs encryption or other security protection processing on the high-level frame received from the flagging unit 32 (step S23). If the high-level frame has been flagged, the MACsec processor 33 temporarily removes the flag to carry out this MACsec processing, holds the flag separately, and then restores the flag, thereby reconfiguring the flagged frame. The MACsec processor 33 supplies the reconfigured flagged frame FS2 to the MAC processor 34. Frame FS2 includes the flag, destination address, and source address, a MACsec header, encrypted data, and an authentication vector, as shown in FIG. 8B. If the high-level frame has not been flagged, the MACsec processor 33 carries out the same security processing on the frame and supplies the processed frame FS2, without a flag, to the MAC processor 34.

Regardless of whether the frame FS2 received from the MACsec processor 33 is flagged or not, the MAC processor 34 carries out MAC processing on the frame FS2 (step S23). If frame FS2 is flagged, the MAC processor 34 removes the flag, carries out the MAC processing, thereby configures a low-level frame FS3, and supplies the low-level frame FS3 to the physical layer processor 38. The low-level frame FS3 includes the destination address, source address, MACsec header, encrypted data, authentication vector, and an FCS, as shown in FIG. 8C. The MAC processor 34 also generates a flag signal indicating that frame FS2 was flagged and sends the flag signal to the flag detector 35. If frame FS2 was not flagged, the MAC processor 34 carries out the same MAC processing, thereby configuring a low-level frame FS3, and supplies the low-level frame FS3 to the physical layer processor 38.

Next, the flag detector 35 determines whether or not the frame FS2 processed by the MAC processor 34 was flagged (step S24). The flag detector 35 determines that frame FS2 was flagged if it receives a flag signal from the MAC processor 34. In this case, the flag detector 35 has the clock unit 36 supply current time information to the timestamp storage unit 37 as a timestamp of frame FS2. If the flag detector 35 determines that frame FS2 was not flagged, the clock unit 36 does not supply a timestamp to the timestamp storage unit 37.

The timestamp storage unit 37 stores the timestamps received from the clock unit 36.

Next, the physical layer processor 38 carries out processing related to the physical layer on the low-level frame FS3 received from the MAC processor 34, thereby configuring a low-level frame FS4, and transmits frame FS4 to the communication network 20 (step S26). The low-level frame FS4 includes a preamble, an SFD, and the destination address, source address, MACsec header, encrypted data, authentication vector, and FCS, as shown in FIG. 8D.

Figure 9:
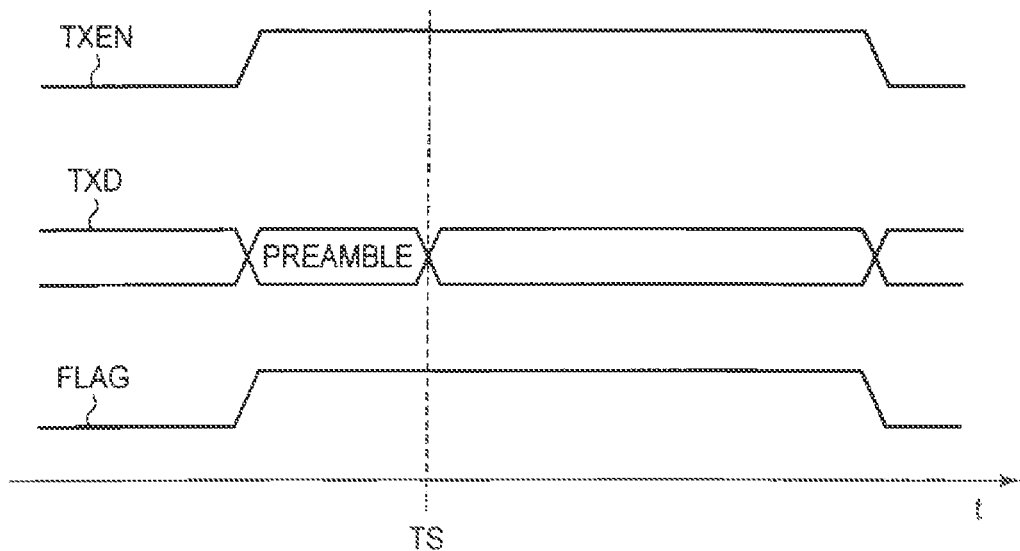
FIG. 9 is a timing diagram illustrating flag detection timing in the frame transmitting apparatus.

FIG. 9 illustrates the flag detection timing in the frame transmitting apparatus 30. The transmit-enable (TXEN) and transmit-data (TXD) signals in FIG. 9 are supplied from the MAC processor 34 to the physical layer processor 38. The flag signal (FLAG) is asserted while the MAC processor 34 holds the flag of a flagged frame, and is output to the flag detector 35 at, for example, a timing TS that marks the end of the preamble data that the physical layer processor 38 adds to the TXD signal. When the flag detector 35 receives the flag signal, the timestamp storage unit 37 stores the current time information, representing time TS, as a time stamp.

As described above, before carrying out MAC and MACsec processing on the high-level frames generated in the upper layer processor 31, the novel frame transmitting apparatus 30 flags each of the high-level frames that needs to have a timestamp stored. The flag detector 35 determines whether each processed high-level frame is flagged; if the flag detector 35 detects a flag, the current time information is stored as a timestamp.

With this structure, the transmission time of a frame can be stored as its timestamp, so when network latency is calculated from the timestamps, the calculated latency excludes extraneous factors such as the time required for encryption and other MACsec processing or MAC processing. In addition, since the decision as to whether or not to store the timestamp is made just by checking a flag, the calculated network latency excludes the time required to analyze the frame to determine whether or not the timestamp is needed.

The frame transmitting apparatus 30 in this embodiment can therefore provide high-precision timestamp information.

System Embodiment

Figure 10:
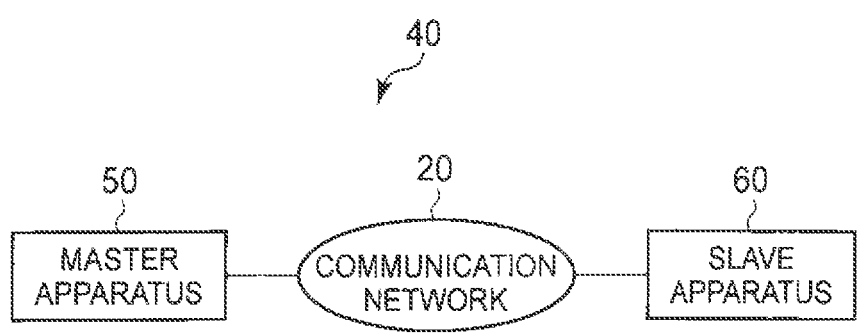
FIG. 10 is a block diagram illustrating the general structure of a frame transmission/reception system.

Referring to FIG. 10, a frame transmission/reception system 40 according to the present invention includes a master apparatus 50 and slave apparatus 60 that exchange timestamp information and other data over a communication network 20.

Figure 11:
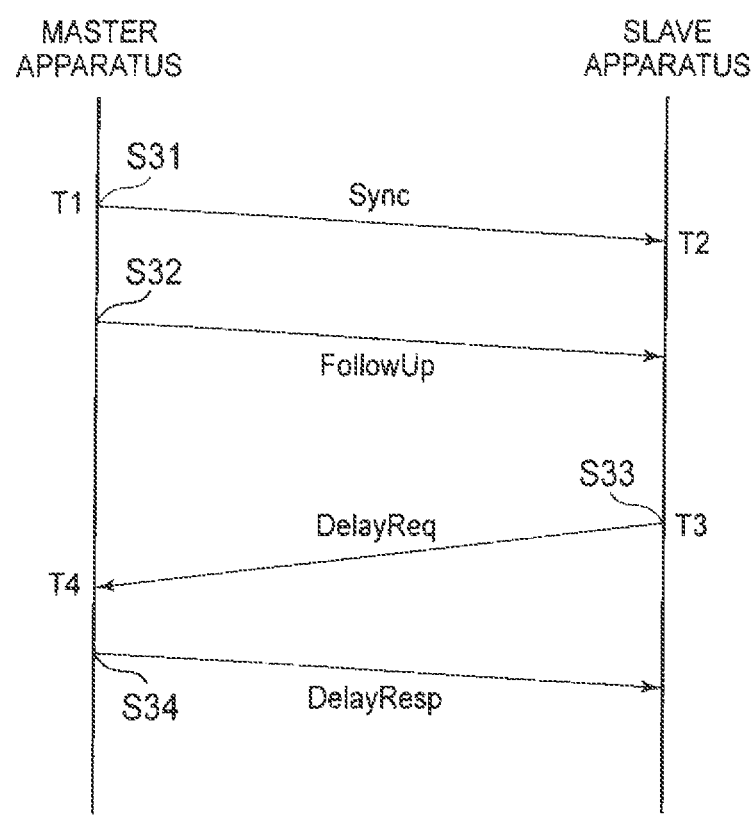
FIG. 11 illustrates messages and timestamps involved in clock synchronization in the frame transmission/reception system in FIG. 10.

FIG. 11 shows the transmitting and receiving sequence by which the master apparatus 50 and slave apparatus 60 maintain clock synchronization.

First, the master apparatus 50, operating as the frame transmitting apparatus 30 in the above embodiment, transmits a Sync message to the slave apparatus 60 (step S31) and stores the Sync message transmission time as timestamp T1. The slave apparatus 60, operating as the frame receiving apparatus 10 in the above embodiment, receives the Sync message and stores the reception time of the message as timestamp T2.

Next, the master apparatus 50 transmits a FollowUp message including the value of timestamp T1 as content to the slave apparatus 60 (step S32). The slave apparatus 60 receives the FollowUp message and stores timestamp T1.

Next, the slave apparatus 60, now operating as a frame transmitting apparatus 30, transmits a DelayReq message to the master apparatus 50 (step S33) and stores the DelayReq message transmission time as timestamp T3. The master apparatus 50, operating as a frame receiving apparatus 10, receives the DelayReq message and stores the reception time of the message as timestamp T4.

Next, the master apparatus 50 transmits a DelayResp message including timestamp T4 as content to the slave apparatus 60 (step S34). The slave apparatus 60 stores the timestamp T4 included in the DelayResp message.

These operations put the slave apparatus 60 in possession of timestamps T1, T2, T3, and T4. The slave apparatus 60 can then calculate a propagation delay time or latency D1 from, for example, the following equation:

$$D1=((T2-T1)+(T4-T3))/2$$

An offset value E1 for clock synchronization can be calculated from the following equation:

$$E1=(T2-T1)-D1.$$

As described in the preceding embodiments, the stored timestamps exclude the time required for MAC and MACsec processing, so regardless of the amount of time required for this media access control and security processing, the calculated latency D1 includes only the propagation delay time on the communication network 20. The slave apparatus 60 therefore need only correct its current time by the above offset value E1 to synchronize its clock to the clock of the master apparatus 50 with high precision. The frame transmission/reception system 40 can accordingly provide high-precision clock synchronization.

In the above embodiments, MAC security processing is carried out on each successive frame, but other types of security protection processing, such as Internet Protocol security (IPsec) processing, for example, may be used with the same effect.

Those skilled in the art will recognize that further variations are possible within the scope of the invention, which is defined in the appended claims.

What is claimed is:

1. A frame receiving apparatus, comprising:
a processor that performs processes of:
receiving a low-level frame belonging to a physical layer from a communication network;
generating a timestamp representing a time at which the low-level frame is received and adding the timestamp to the low-level frame, thereby generating a timestamped frame;
removing the timestamp from the timestamped frame, thereby holding the removed timestamp;
converting a frame obtained by removing the timestamp from the timestamped frame, to a high-level frame belonging to an upper layer; and
restoring the removed timestamp to the high-level frame; and
a storing unit for selectively storing the time represented by the timestamp, depending on content of the high-level frame.

2. The frame receiving apparatus of claim 1, wherein the storing unit removes the timestamp from the high-level frame.

3. The frame receiving apparatus of claim 1, wherein the storing unit stores the time represented by the timestamp when the high-level frame includes a Sync message or a DelayReq message.

4. A frame transmitting apparatus comprising:
a processor that performs processes of:
selectively flagging high-level frames, depending on content of the high-level frames;
removing flags from the flagged high-level frames respectively, thereby holding the removed flags;
converting each frame obtained by removing the flag from the flagged high-level frame to a low-level frame belonging to a physical layer;
restoring the removed flag to the low-level frame, thereby generating a flagged low-level frame;
transmitting the flagged low-level frame over a communication network; and
determining, during conversion of the high-level frame to the low-level frame, whether the high-level frame was flagged; and
a storing unit for storing a time of detection that the high-level frame was flagged as a transmission time.

5. The frame transmitting apparatus of claim 4, wherein the processor performs a process of flagging the high-level frame if the high-level frame includes a Sync message or a DelayReq message.

6. A frame transmission and reception system including frame transmitting apparatus and frame receiving apparatus for transmitting and receiving frames over a communication network, wherein:
the frame transmitting apparatus comprises
a first processor that performs processes of:
selectively flagging first high-level frames belonging to an upper layer, depending on content of the high-level frames,
removing flags from the flagged first high-level frames respectively, thereby holding the removed flags,
converting each frame obtained by removing a flag from a flagged first high-level frame to a low-level frame belonging to a physical layer,
restoring the removed flag to the low-level frame, thereby generating a flagged low-level frame,
transmitting the flagged low-level frame over the communication network, and
determining, during conversion of the first high-level frame to the low-level frame, whether the first high-level frame was flagged, and
a first storing unit for storing a time of detection that the first high-level frame was flagged as a transmission time; and
the frame receiving apparatus comprises
a second processor that performs processes of:
receiving the low-level frame from the communication network,
generating a timestamp representing a time at which the low-level frame is received and adding the timestamp to the low-level frame, thereby generating a timestamped frame,
removing the timestamp from the timestamped frame, thereby holding the removed timestamp,
converting a frame obtained by removing the timestamp from the timestamped frame, to a second high-level frame belonging to the upper layer, and
restoring the removed timestamp to the second high-level frame, and
a second storing unit for selectively storing the time represented by the timestamp, depending on content of the second high-level frame.

7. The frame transmission and reception system of claim 6, wherein the second storing unit removes the timestamp from the second high-level frame.

8. The frame transmission and reception system of claim 6, wherein the second storing unit stores the time represented by the timestamp if the second high-level frame includes a Sync message or a DelayReq message.

9. The frame transmission and reception system of claim 6, wherein the second processor performs a process of flagging the second high-level frame if the high-level frame includes a Sync message or a DelayReq message.

10. The frame transmission and reception system of claim 6, wherein the first processor and the second processor perform security processing.

11. A method of transmitting frames over a communication network, comprising:
selectively flagging high-level frames belonging to an upper layer, depending on content of the high-level frames;
removing flags from the flagged high-level frames respectively, thereby holding the removed flags,
converting each frame obtained by removing the flag from the flagged high-level frame to a low-level frame belonging to a physical layer;
restoring the removed flag to the low-level frame, thereby generating a flagged low-level frame,
transmitting the flagged low-level frame over the communication network;
determining, during conversion of the first high-level frame to the low-level frame, whether the first high-level frame was flagged;
storing a time of detection that the first high-level frame was flagged as a transmission time;
receiving the low-level frame from the communication network;
generating a timestamp representing a time at which the low-level frame is received and adding the timestamp to the low-level frame, thereby generating a timestamped frame;
removing the timestamp from the timestamped frame, thereby holding the removed timestamp;

converting a frame obtained by removing the timestamp from the timestamped frame, to a second high-level frame belonging to the upper layer; and restoring the removed timestamp to the second high-level frame, and selectively storing the time represented by the timestamp, depending on content of the second high-level frame.

12. The method of claim 11, wherein selectively storing the time represented by the timestamp further comprises removing the timestamp from the second received high-level frame.

13. The method of claim 11, wherein the time represented by the timestamp is stored if the second high-level frame includes a Sync message or a DelayReq message.

14. The method of claim 11, wherein the high-level frame is flagged if the second high-level frame includes a Sync message or a DelayReq message.

* * * * *